United States Patent
Sundquist et al.

(10) Patent No.: US 12,138,868 B2
(45) Date of Patent: Nov. 12, 2024

(54) DRAPE FORMING APPARATUS AND DEVICE, AND METHOD OF FORMING A COMPOSITE STRUCTURE

(71) Applicant: The Boeing Company, Chicago, IL (US)

(72) Inventors: David John Sundquist, St. Peters, MO (US); Trevor Lee Howard, St. Louis, MO (US); Steven J. Burpo, St. Charles, MO (US); Kurtis Shuldberg Willden, Kent, WA (US)

(73) Assignee: The Boeing Company, Chicago, IL (US)

( * ) Notice: Subject to any disclaimer, the term of this patent is extended or adjusted under 35 U.S.C. 154(b) by 38 days.

(21) Appl. No.: 17/547,365

(22) Filed: Dec. 10, 2021

(65) Prior Publication Data
US 2022/0212423 A1 Jul. 7, 2022

Related U.S. Application Data

(60) Provisional application No. 63/133,556, filed on Jan. 4, 2021.

(51) Int. Cl.
| | |
|---|---|
| *B29C 70/44* | (2006.01) |
| *B29C 35/02* | (2006.01) |
| *B29C 43/12* | (2006.01) |
| *B29C 43/36* | (2006.01) |

(Continued)

(52) U.S. Cl.
CPC ............. *B29C 70/44* (2013.01); *B29C 43/52* (2013.01); *B29C 53/02* (2013.01); *B29C 53/84* (2013.01);
(Continued)

(58) Field of Classification Search
None
See application file for complete search history.

(56) References Cited

U.S. PATENT DOCUMENTS

| | | | |
|---|---|---|---|
| 10,688,697 B2 | 6/2020 | Sundquist et al. | |
| 2006/0249883 A1* | 11/2006 | Oguma | B29C 70/44 264/339 |

(Continued)

FOREIGN PATENT DOCUMENTS

| | | | | |
|---|---|---|---|---|
| EP | 4023420 A1 * | 7/2022 | ............. | B29C 70/44 |
| JP | H0542590 A | 2/1993 | | |

(Continued)

OTHER PUBLICATIONS

Akiyama, K. et al. English Machine Translation of JP-2014051065-A: "Molding Apparatus and Molding Method of Prepreg Laminated Material". EPO. Espacenet. 2023 (Year: 2023).*

(Continued)

*Primary Examiner* — Farah Taufiq
*Assistant Examiner* — Jonathan B Woo
(74) *Attorney, Agent, or Firm* — Quinn IP Law

(57) ABSTRACT

A drape forming apparatus includes a forming tool having a first forming surface and a second forming surface nonplanar with the first forming surface. A tray is spaced apart from the forming tool and is configured to pivot about a hinged end from a first position to a second position under an applied force such that a distal end moves away from the forming tool. A first side of the tray faces a first heat source when the tray is in the first position, and a second heat source is disposed at a second side of the tray. A device for use in forming the composite structure includes a standoff and the tray, and a heat source is secured to the second side of the tray. A method of forming a composite structure includes heating both sides of the composite material with the first and second heat sources.

20 Claims, 10 Drawing Sheets

(51) Int. Cl.
  *B29C 43/52* (2006.01)
  *B29C 53/02* (2006.01)
  *B29C 53/84* (2006.01)
  *B29C 70/54* (2006.01)
(52) U.S. Cl.
  CPC ............ *B29C 70/54* (2013.01); *B29C 70/543* (2013.01); *B29C 2035/0211* (2013.01); *B29C 43/12* (2013.01); *B29C 43/36* (2013.01)

(56) References Cited

U.S. PATENT DOCUMENTS

2015/0352795 A1* 12/2015 Coxon .................. B29C 70/541
                                                            425/389
2017/0106607 A1* 4/2017 Anderson ............. B29C 70/342
2017/0210040 A1* 7/2017 Sundquist ............... B29C 70/54
2018/0126604 A1  5/2018 Tokutomi
2018/0281269 A1* 10/2018 Sundquist ............... B29C 70/44
2019/0016040 A1* 1/2019 Robins .................. B29C 70/541

FOREIGN PATENT DOCUMENTS

JP     Y-05-014834      *  4/1993
JP     2014051065 A     *  3/2014

OTHER PUBLICATIONS

EPO. "European Written Opinion for EP-4023420-A1". WIPO. Patentscope. 2023 (Year: 2023).*

* cited by examiner

DRAPE FORMING APPARATUS AND DEVICE, AND METHOD OF FORMING A COMPOSITE STRUCTURE

CROSS-REFERENCE TO RELATED APPLICATION

The present application claims the benefit of priority to U.S. Provisional Application No. 63/133,556, filed on Jan. 4, 2021, which is hereby incorporated by reference in its entirety.

TECHNICAL FIELD

The disclosure relates to a drape forming apparatus and device, and a method of forming a composite structure, with heat sources at opposing faces of the composite structure.

BACKGROUND

Composite materials, including carbon fiber epoxy impregnated laminates, are often used in applications requiring high strength and light weight, such as in the aerospace industry. At least some known composite structures are formed using a process known as hot drape forming. Hot drape forming typically includes heating one or more plies of flat pre-impregnated (i.e., prepreg) composite material, and forcing the composite material around a mandrel with a vacuum bag or a pressurized bladder device. When sufficiently heated, the plies can slide relative to one another in order to form a desired nonplanar shape. However, it is difficult and time consuming to form the sheet-like composite material into a non-planar composite structure while avoiding unacceptable buckling or wrinkling of the composite material.

SUMMARY

For relatively thick composite materials, uniform heating to a desired forming temperature using known drape forming apparatuses may be unattainable within a predetermined time threshold and/or without exceeding a predetermined maximum temperature. For example, a portion of a composite material closest to a heat source (e.g., a top ply) may quickly attain a desired forming temperature while a portion furthest from the heat source (e.g., a bottom ply) remains below the desired forming temperature.

A drape forming apparatus, flange forming device, and method of forming a composite material are disclosed herein that, in various embodiments, allow more uniform heating of the composite material in combination with controlled forming rate for avoiding wrinkling of the material. The composite structure may be used in a variety of implementations, especially those in which a controlled surface profile is desired (e.g., with minimal surface wrinkling), such as at an exterior of an aircraft. Representative applications include, without limitation, aeronautical components and control surfaces, including rudders, flaps, and wing surfaces. Other industries utilizing composite structures may also benefit from the improvements described herein.

A drape forming apparatus disclosed herein, such as for use in forming a composite structure, includes a forming tool having a first forming surface and a second forming surface nonplanar with the first forming surface. A tray is spaced apart from the forming tool and has a first side and a second side. The tray has a hinged end and a distal end, and is configured to pivot about the hinged end from a first position to a second position under an applied force such that the distal end moves away from the forming tool. The drape forming apparatus also includes a first heat source and a second heat source. The first side of the tray faces the first heat source when the tray is in the first position, and the second heat source is disposed at the second side of the tray. Accordingly, a composite material disposed on the tray is heated at both sides by the first and second heat sources, and pivots with the tray to be formed to the second forming surface. As the material is incrementally withdrawn from the tray at a controlled rate corresponding with the rate of pivoting, the portion moved furthest from the first heat source remains on the tray being heated by the second heat source until finally withdrawn. The two-sided heating provided by the drape forming apparatus may help to minimize a temperature gradient through the material, which is especially helpful when drape forming relatively thick composite materials.

Also disclosed herein is a device for use in forming a composite structure that includes a standoff and a tray having a first side and a second side, the tray having a hinged end and a distal end, the tray configured to pivot about the hinged end from a first position to a second position under an applied force. A heat source is secured to the second side of the tray.

A method of forming a composite structure, such as by utilizing the drape forming apparatus and flange forming device disclosed herein includes disposing at least one layer of composite material over a first forming surface of a forming tool so that a portion of the at least one layer of composite material is positioned on a first side of a tray coplanar with the first forming surface when the tray is in a first position, the tray having a hinged end and a distal end with the distal end nearer the first forming surface than the hinged end when the tray is in the first position. The method includes heating a first side of the at least one layer of composite material with a first heat source, the first side facing the first heat source when the tray is in the first position. The method further includes heating a second side of the at least one layer of composite material with a second heat source, the second heat source disposed at a second side of the tray. Under the method, a force is applied on the tray such that the tray pivots about the hinged end, the distal end moves away from the forming tool, and such that the portion of the at least one layer of composite material is withdrawn from the tray and is disposed against a second forming surface of the forming tool nonplanar with the first forming surface.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

The drawings described herein are for illustrative purposes only, are schematic in nature, and are intended to be exemplary rather than to limit the scope of the disclosure.

DETAILED DESCRIPTION

Disclosed herein are various embodiments of drape forming apparatuses, flange forming devices, and methods of forming composite structures that include two-sided heating of the composite material, and specifically, two-sided heating of a portion of the composite material to be formed as a flange. Especially when forming relatively thick, multi-ply composite material, a temperature gradient through the material could lead to undesirable wrinkling. By disposing a first heat source at one face of the composite material and a second heat source at an opposite, second face of the composite material, predetermined forming temperature and time ranges can be achieved, the heat sources may be separately controlled for more uniform heating and final properties of the composite structure, and production time goals can be achieved. Additionally, the improved heating arrangement may be integrated with aspects of the drape forming apparatus that allow a rate of forming of the flange portion to be controlled.

Figure 1:
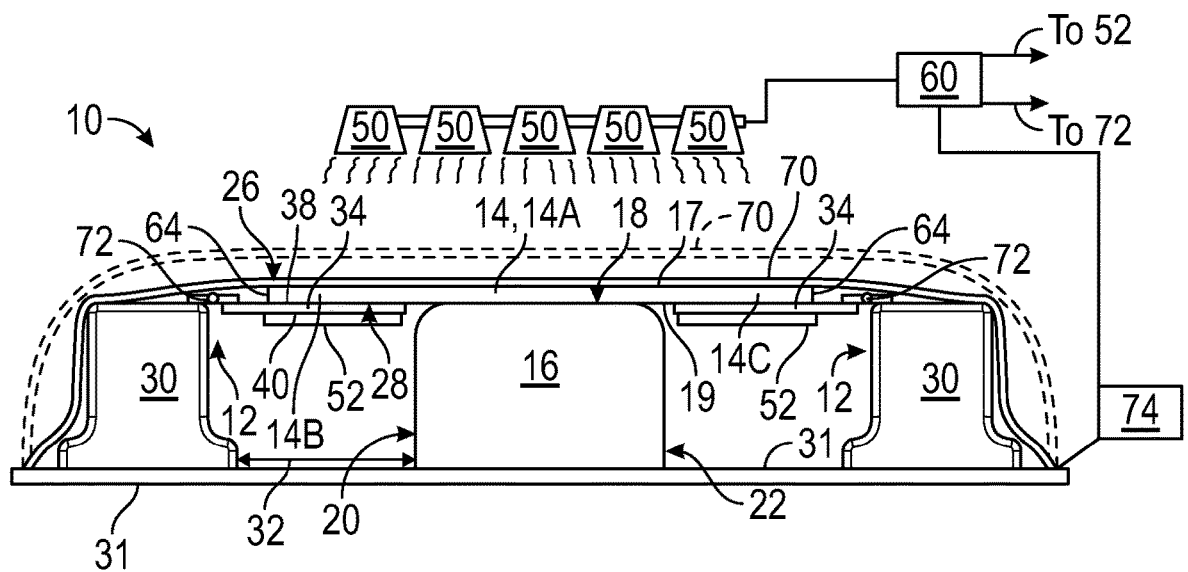
FIG. 1 is a side view illustration of a first embodiment of a drape forming apparatus with two-sided heating and with pivotable trays in a first position supporting a composite material.
Figure 2:
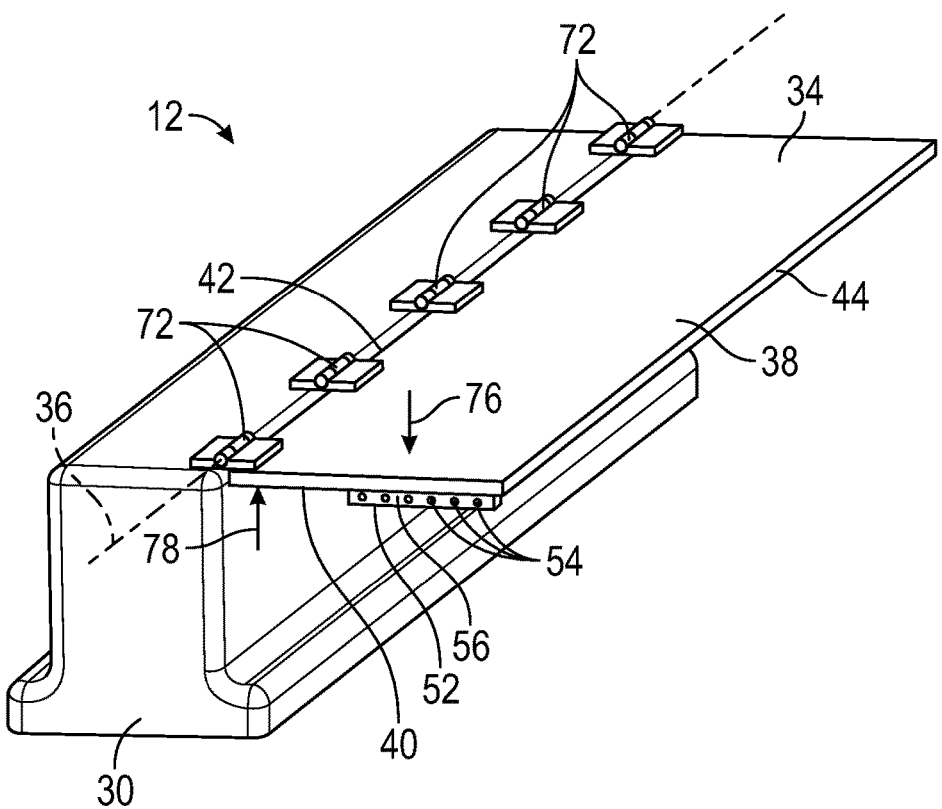
FIG. 2 is an illustration in perspective view of a first embodiment of a flange forming device included in the drape forming apparatus of FIG. 1 showing one of the pivotable trays.
Figure 4:
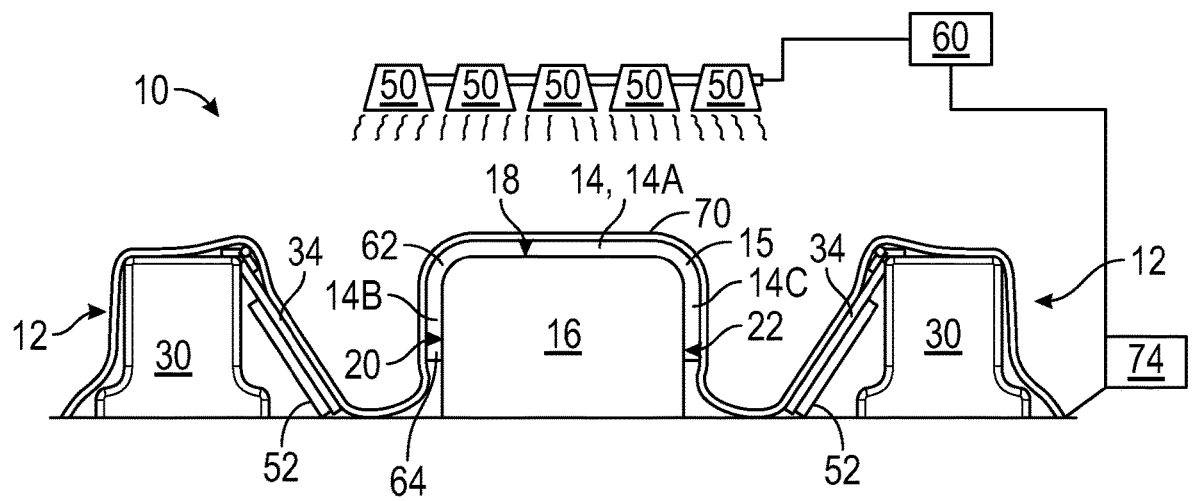
FIG. 4 is a side view illustration of the drape forming apparatus of FIG. 1 with the pivotable trays in a second position during a final curing stage of forming the composite structure.

Referring to the drawings, wherein like reference numbers refer to like components, FIG. 1 is a side view illustration of a first embodiment of a drape forming apparatus 10 that includes two flange forming devices 12, one of which is shown in perspective view in FIG. 2. In the implementation shown, a composite material 14 can be formed into a composite structure 15 with two flange portions, as shown in FIG. 4, by utilizing both of the flange forming devices 12. The flange forming device 12 on the right side of FIG. 1 has like components functioning in the same manner as those of the flange forming device 12 on the left side of FIG. 1. In some embodiments, only one of the flange forming devices 12 is included, such as when a composite structure with only one flange portion is to be formed.

The flange forming apparatus 10 includes a forming tool 16 that has a first forming surface 18 and a second forming surface 20 nonplanar with and extending from the first forming surface 18. In the embodiment shown, the first forming surface 18 is an upper forming surface and the second forming surface 20 is a side forming surface that is substantially perpendicular to the first forming surface 18. However, in an alternative implementation, the second forming surface 20 could extend from the first forming surface 18 at a different non-planar orientation. For example, the second forming surface 20 could be arcuate of otherwise contoured, could be disposed at a complementary angle to the first forming surface 18, or could be disposed at any angle or orientation and have any shape relative to the first forming surface 18 that enables the drape forming apparatus 10 to function as described herein.

In the embodiment shown, the forming tool 16 also has a third forming surface 22 nonplanar with and extending from the first surface 18, and opposite to the second forming surface 20 as another side forming surface. The description herein of utilizing the flange forming device 12 shown at the left side of FIG. 1 to form a flange portion 14B to the second forming surface 20 applies equally to the like flange forming device 12 shown at the right side of FIG. 1 that is used to form a like flange portion 14C to the third forming surface 22. The orientation of the forming surfaces 18, 20, and 22 in the embodiment of the forming tool 16 as shown can be used to form a composite structure 15 having two arm portions extending from a main portion, defining a channel.

As described in further detail herein, at least one layer of composite material 14 is disposed on the forming tool 16 as shown in FIG. 1. More specifically, a main portion 14A of the composite material 14 rests on the forming tool 16 while opposing flange portions 14B and 14C extend from the main portion 14A and are laterally outward of the first forming surface 18 in preparation for drape forming to the respective second and third side surfaces 20, 22 of the forming tool 16. The flange forming device 12 includes a standoff 30 spaced apart from the forming tool 16 by a predetermined distance 32, also referred to as a gap. Both the forming tool 16 and the standoff(s) 30 may be secured in place on a platform 31 to maintain the predetermined distance 32.

The flange forming device 12 also includes a pivotable tray 34 coupled to and supported by the standoff 30. Each flange portion 14B, 14C rests on a respective pivotable tray 34. Top surface 26 of the composite material 14 is furthest from the tray 34, while a bottom surface 28 of the composite material 14 rests on the tray 34. More particularly, the tray 34 is supported by the standoff 30 such that the tray 34 is pivotable relative to the standoff 30 about a pivot axis 36 best shown in FIG. 2. The pivot axis 36 extends perpendicular to the plane of the page in FIG. 1. The tray 34 has a first side 38 and a second side 40 opposite to the first side 38. In the embodiment shown, the first side 38 faces generally upward when the tray 34 is in the first position shown in FIG. 1, and the second side 40 faces generally downward when the tray 34 is in the first position at the beginning of the drape forming process. The tray 34 has a hinged end 42 pivotably supported by the standoff 30 and a distal end 44 opposite from the hinged end. The tray 34 is configured to pivot about the pivot axis 36 near the hinged end 42, moving within the gap 32 from the first position to a second position (shown in FIG. 4) under an applied force 76 such that the distal end 44 moves away from the forming tool 16.

To achieve desired material properties of the final composite structure after drape forming, including an absence of or reduction in significant wrinkles, the drape forming apparatus 10 provides two-sided heating of the flange portion(s) 14B, 14C, with first and second heat sources 50, 52 disposed at respective opposing first and second sides 17, 19 of the composite material 14 (e.g., at the top surface 26 and the bottom surface 28). The heat sources 50, 52 may be independently controllable and implementable with the controlled forming rate of the composite material 14 afforded by the pivoting tray 34 of the flange forming device 12.

As shown in FIG. 1 the drape forming apparatus 10 includes a first heat source 50. In the embodiment shown, the first heat source 50 is at least one heat lamp fixed in position relative to the forming tool 16 and the standoff(s) 30. When the tray 34 is in the first position of FIG. 1, the first side 38 of the tray 34 faces the first heat source 50. The drape forming apparatus 10 also includes a second heat source 52 disposed at the second side 40 of the tray 34. In the embodiment shown, the second heat source 52 is a heat pad that includes a resistance heating element 54. For example, the resistance heating element 54 may be a wire and the heat pad 52 may include a base 56, such as a silicone rubber base, in which the resistance heating element 54 is embedded and through which heat radiates to heat the tray 34. As an alternative to or in addition to heating via a hear pad and a resistance heating element, the second heat source may heat the second side 40 of the tray 34 by convection heating, circulating heated fluid, or otherwise.

The second heat source 52 may be secured directly to the second side 40 of the tray 34 as in the embodiment shown, such as with adhesive. The second heat source 52 may extend below the composite material 14 only to the far extent 64 when the tray 34 is in the first position, or may extend further laterally outward than the far extent 64. In other embodiments, the second heat source 52 could be another mode of heating, such as at least one heat lamp disposed so that the second side 40 of the tray 34 faces the at least one heat lamp when the tray 34 is in the first position.

Optionally, heat output of the first heating source 50 and heat output of the second heat source 52 may be independently controlled by an electronic controller 60 operatively connected to each of the heat sources 50, 52 such as by controlling electrical power to each heat source. For example, the second heat source 52 can thus be controlled to provide heat uniformly along the portion of the tray 34 to which it is secured regardless of the position of the tray 34 (e.g., whether at the first position, at an intermediate position, or at the second position). Similarly, power to the first heat source 50 may be controlled by the electronic controller 60 throughout the forming process and separately from the second heat source 52. One or more temperature sensors, such as a thermocouple, may be positioned on or in the tray 34, on or in the second heat source 52, and/or on a membrane 70 described herein. The second heat source 52 is fixed to and moves with the tray 34 while the first heat source 50 is fixed in position relative to the forming tool 16 and the standoff 30. While the first side 38 of the tray 34 is moving further away from the first heat source 50 during pivoting of the tray 34 from the first position to the second position, the second side 40 of the tray 34 remains fixed in position relative to the second heat source 52.

With reference to FIG. 1, during the drape forming process, the tray 34 is made to pivot as a result of a net force against the first side 38 of the tray 34 resulting from an applied force 76 of a membrane 70 and an opposing, resisting force 78 of a resistance device 72. In an example, the membrane 70 may be a flexible, air-tight bladder to which a pressure differential may be applied, such as via a vacuum 74 applied at an interior surface of the membrane and/or a pressure applied at an exterior surface of the membrane, depending upon the sealing arrangement of the membrane 70 in the drape forming apparatus 10. Alternatively or in addition, fluid pressure may be applied to the exterior of the membrane 70. The membrane 70 is disposed over the forming tool 16, the standoff(s) 30, and the tray 34 on the first side 38 of the tray 34, and therefore over the top surface 26 of the composite material 14 disposed on the forming tool 16 and the tray 34. The membrane 70 is configured to exert the applied force 76 on the tray 34 in response to the controller 60 commanding a pressure differential on opposing sides of the membrane 70. In FIG. 1, the membrane 70 is shown in a first state with dashed lines, prior to the controller 60 initiating a vacuum and/or pressure on the membrane 70. The membrane 70 is shown in solid lines in a second state in which the membrane 70 is engaged with and exerts an applied force 76 distributed against the top surface 26 of the composite material 14, including the flange portions 14B, 14C, that encourages pivoting of the tray 34 from the first position to the second position (e.g., the applied force 76 is exerted downward on the tray 34).

The resistance device 72 is coupled to the tray 34 and automatically or controllably (e.g., operable under the control of the controller 60) exerts a resisting force 78 on the tray 34 opposite to the applied force 76. The resisting force 76 resists pivoting of the tray 34 from the first position to the second position. In the embodiment shown in FIGS. 1-5, the resistance device 72 is an adjustable resistance friction hinge having a hinge axis coincident with the pivot axis 36. As shown in FIG. 2, there may be multiple resistance devices 72 disposed along the length of the tray 34 and each aligned with the pivot axis 36. The friction within the hinge of the resistance device 72 is representable by the resisting force 78 pushing upward on the tray 34 (e.g., resisting picoting from the first position to the second position).

The heat sources 50, 52 may be controlled to ramp the temperature of the composite material 14 from room temperature to a predetermined forming temperature or to within a predetermined forming temperature range (e.g., within 10 degrees of a predetermined forming temperature), and then to maintain the composite material 14 at this temperature or within this range of temperatures for a predetermined period of time. Once the predetermined forming temperature or predetermined forming temperature range is achieved, the force 76 applied to the tray 34 may be simultaneously controlled to cause the tray 34 to pivot from the first position to the second position. The pivoting may be at a controlled rate, such as a constant rate, such as by controlling the vacuum and/or pressure acting on the membrane 70. The resistance force 78 applied by the resistance device 72 may also be controlled or, in some embodiments, may be automatic, with only the applied force 76 of the membrane 70 controlled to control the rate of pivoting. Pivoting causes the flange portions 14B, 14C to withdraw from the trays 34 and form to the second and third forming surfaces 20, 22, respectively, at a rate (e.g., inches withdrawn per second) that corresponds with the rate of pivoting (e.g., angles per second) of the tray 34. A near extent 62 of the flange portion 14B closest to the forming tool 16 when the tray is in the first position will initially withdraw, with the far extent 64 of the flange portion 14B that is furthest from the forming tool 16 when the tray 34 is in the first position (e.g., the side edge of the flange portion 14B) being the last to withdraw and form to the second forming surface 20 when the tray 34 is pivoted further toward the second position. The flange portion 14B is thus heated by the second heat source 52 longer at and near the far extent 64 than at and near the near extent 62. However, the near extent 62 moves little if at all further from the first heat source 50 during forming while the far extent 64 moves further away from the first heat source 50 according to the controlled rate of pivoting of the tray 34. Thus, the declining contribution of heat from the first heat source 50 in the direction from the near extent 62 to the far extent 64 is countered by the increasing contribution of heat by the second heat source 52 in the direction from the near extent 62 to the far extent 64. The ability of the controller 60 to control the rate of withdrawal of the flange portion 14C from the tray 34 (e.g., by controlling the applied force) while also controlling the heat output of the first heat source 50 and the second heat source 52 enables control of the internal temperature profile of the composite material 14, including the ability to prevent or limit a temperature gradient in the flange portion 14B between a temperature at the top surface 26 of the composite material 14 and a temperature at the opposite bottom surface 28 of the composite material 14.

The composite material 14 may be any composite to be formed to a desired composite structure by drape forming, and may include a first material arranged in a matrix of a second material different from the first material, with the second material softening when heated to allow the composite material to be drape formed to a desired shape. In an implementation, the composite material 14 may be carbon fiber disposed in a resin matrix such as an epoxy resin matrix. For example, the composite material 14 may be laminated plates or sheets of carbon fiber impregnated with an epoxy resin matrix. Prior to drape forming, the composite material 14 may have an overall flat shape, such as a flat sheet. During drape forming, the resin matrix must be sufficiently heated to allow the composite material 14 to form to the shape of the forming tool 16. For example, when there are multiple layers (e.g., plies) of carbon fiber material, these layers slide relative to one another as the material 14 is formed to the shape of the forming tool 16. Heating and softening of the resin matrix material enables this reorientation of the carbon fiber material to adopt the final formed shape composite structure. Heating of the composite material 14 to a uniform predetermined temperature or temperature range and forming the material at a controlled rate, such as a predetermined uniform rate, can best avoid the formation of wrinkles in the material. The composite material 14 may have a predetermined, designated forming temperature or temperature range (e.g., based upon prior testing) that enables the requisite pliability of the composite material 14 during forming, and may also have a predetermined maximum forming temperature and/or a predetermined maximum time above a threshold temperature that, if either is exceeded, may result in insufficient material or aesthetic properties of the final formed composite structure 15. Additionally, an excessively long heating time adds to the manufacturing cycle time. If the composite material 14 is relatively thick (e.g., whether it is a single layer (also referred to as a single ply) that is relatively thick, or multiple layers), heating of the composite material 14 to a predetermined forming temperature or temperature range from only one side may require an unsatisfactorily long cycle time and/or may cause the side closest to the single heat source to be at an elevated temperature for longer than is optimal to attain desired material properties in the final formed composite structure. The two-sided heating solution disclosed herein solves these issues while integrating the controlled pivoting of the tray 34 to enable more uniform heating and forming of the flange portions 14B and 14C as described. In some implementations, heating time may be shortened by 50 percent with the two-sided heating solutions disclosed herein.

The flange forming device 12 may include one or more position sensors disposed on the standoff 30, on the tray 34, and/or on the resistance device 72 to enable the controller 60 to monitor the position of the tray 34, and then, based on the position information, control the pressure differential acting on the membrane 70 (and, in some embodiments, control the resisting force 76 of the resistance device 72), to control the rate of pivoting of the tray 34 and the resulting rate of forming of the flange portion 14B against the side surface 20 (and the flange portion 14C against the side surface 22). For example, the controller 60 may implement a uniform rate of forming by control of the pressure differential acting on the membrane 70 (e.g., control of the level of vacuum 74 applied to the membrane 70).

Figure 3:
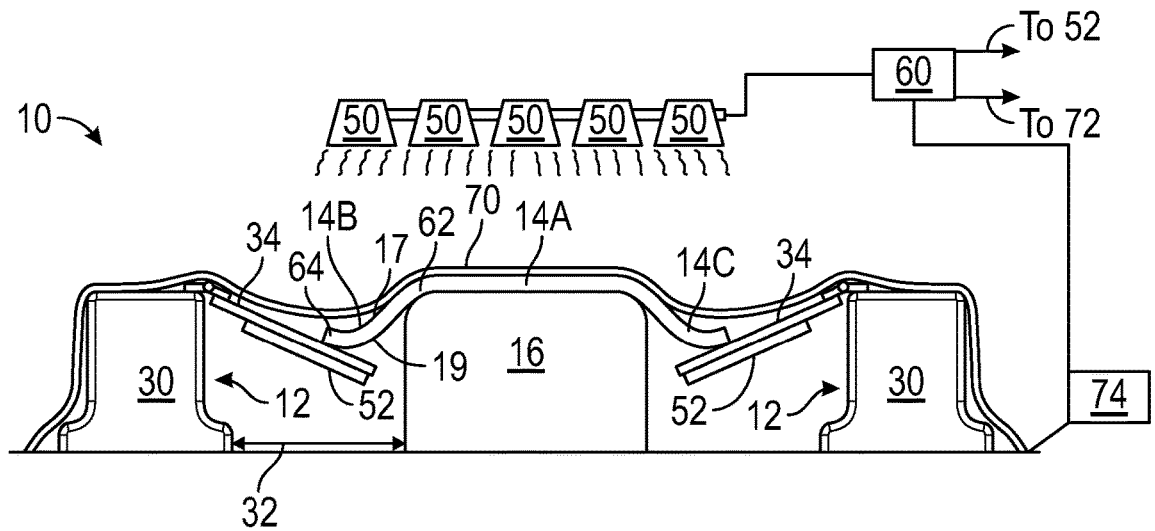
FIG. 3 is a side view illustration of the drape forming apparatus of FIG. 1 at an intermediate stage of forming a composite structure.

FIG. 3 is a side view illustration of the drape forming apparatus 10 of FIG. 1 at an intermediate stage of forming a composite structure 15 (shown in FIG. 4). The trays 34 are shown pivoted from the first position of FIG. 1 to an intermediate position, with the flange portions 14B, 14C of the heated composite material 14 beginning to be withdrawn from the trays 34 and change shape from the configuration in which they are coplanar with the main portion 14A to a partially bent configuration. As discussed, the near extent 62 gradually receives less direct heating by the tray 34 via the second heat source 52 while the far extent 64 moves further from the first heat source 50 but continues in contact with the tray 34, receiving direct heat from the tray 34 via the second heat source 52 as the tray 34 pivots in the gap between the forming tool 16 and the standoff 30.

FIG. 4 is a side view illustration of the drape forming apparatus 10 with the pivotable trays 34 pivoted further than the intermediate position of FIG. 3 to the final second position at a final stage of forming the composite structure 15. The heat sources 50, 52 may each be independently controlled to continue heating according to a desired temperature profile for a predetermined time. For example, power to the heat sources 50, 52 may be controlled to set the heat output of each of the heat sources 50, 52 to zero as the composite structure 15 cools in the final shape shown in FIG. 4. The vacuum/and or pressure on the membrane 70 can be released and the composite structure 15 then removed from the forming tool 16 in its final, formed shape. The trays 34 can be moved to the first position in preparation for forming a subsequent composite structure with the drape forming apparatus 10.

Figure 5:
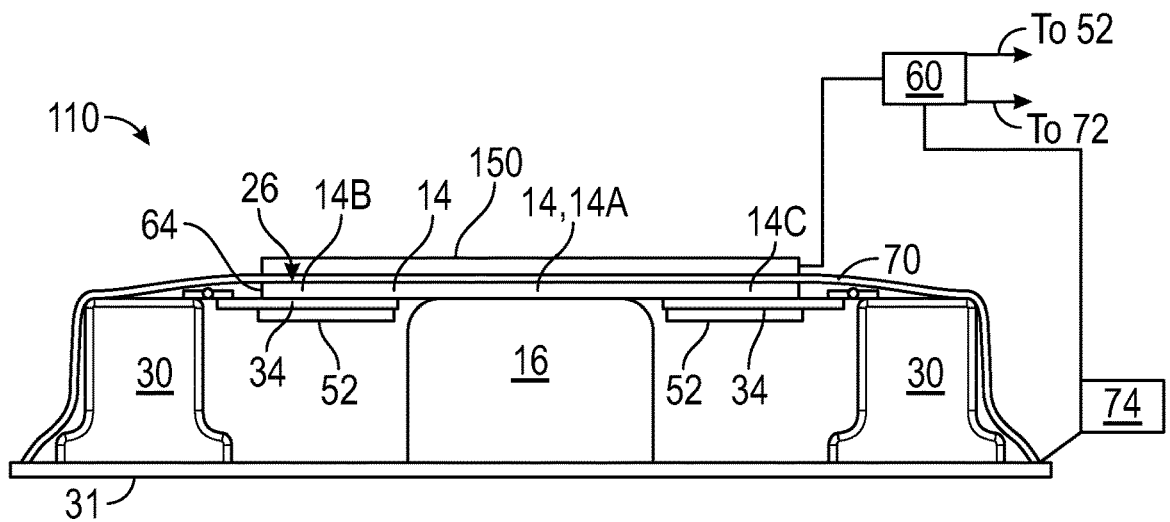
FIG. 5 is a side view illustration of a second embodiment of a drape forming apparatus with two-sided heating and pivotable trays in a first position supporting a composite material.

FIG. 5 is a side view illustration of a second embodiment of a drape forming apparatus 110 with two-sided heating and pivotable trays 34 in a first position supporting a composite material 14. The drape forming apparatus 110 is identical to and functions as described with respect to the drape forming apparatus 10 except that the first heat source is a heat blanket 150 disposed on the membrane 70 rather than the at least one heat lamp 50 of the drape forming apparatus 10. The heat blanket 150 may be sized to extend over the composite material 14 at least to the far extent 64 of the composite material 14. The heat blanket 150 may be controlled via the controller 60, and may provide a uniform heat output over the top surface 26 of the composite material 14, or may provide more heat over the flange portions 14B, 14C or an amount of heat that differs at different areas of the flange portions 14B, 14C as may be desired to achieve a predetermined temperature profile through the composite material 14. In an implementation, heat may be applied by the heat blanket 150 to heat the membrane 70 prior to applying the pressure differential (e.g., via the vacuum 74) to the membrane 70.

Figure 6:
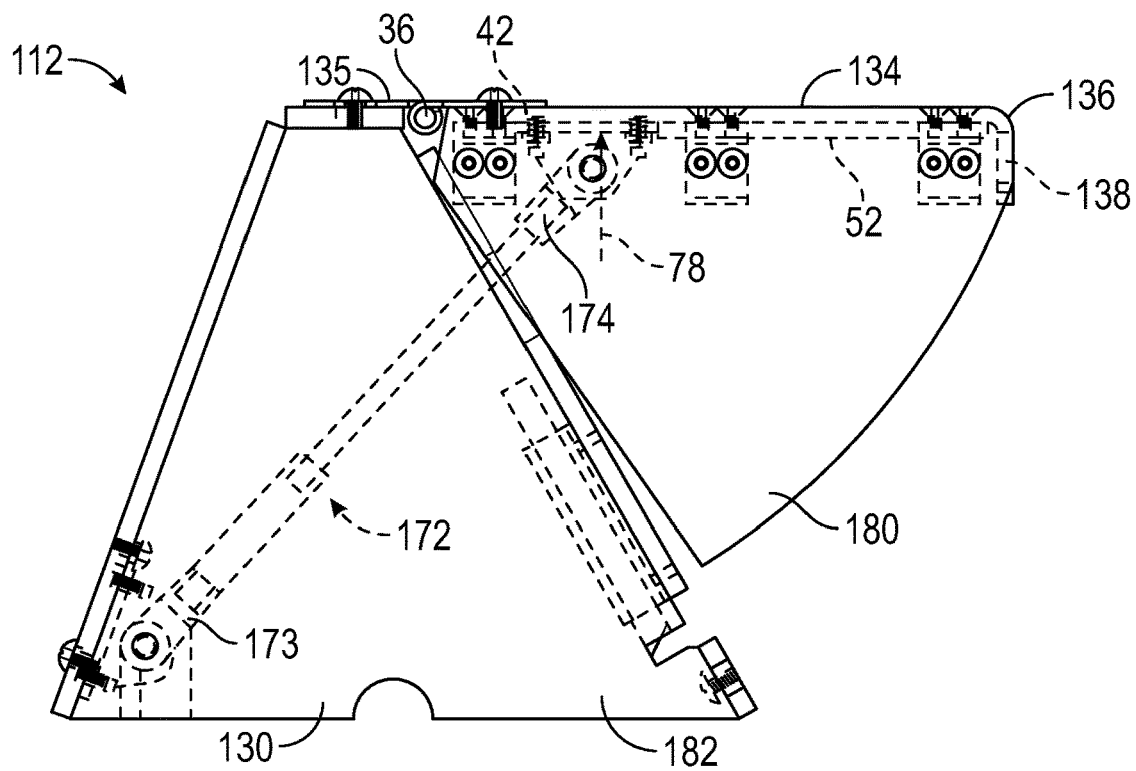
FIG. 6 is a side view illustration of a second embodiment of a flange forming device for use in any of the drape forming apparatuses disclosed herein and with a pivotable tray in a first position.

FIG. 6 is a side view illustration of a second embodiment of a flange forming device 112 for use in place of flange forming device 12 in the drape forming apparatus 10 or 110, or for use in any of the other drape forming apparatuses disclosed herein. The drape forming device 112 includes a standoff 130 with a pivotable tray 134 secured to the standoff and shown in a first position. The tray 134 is hinged to the standoff at hinges 135 and pivotable relative to the standoff 130 about pivot axis 36 at a hinged end 42. The hinges 135 may not be friction hinges as in FIG. 1, as the flange forming device 112 instead includes a resistance device 172 that may be a linear actuator having one end 173 pivotably coupled to the standoff 130 and an opposite end 174 pivotably coupled to the tray 134. Linear actuator 172 may be actuated by any suitable means such as, but not limited to, electrical and pneumatic. The resistance device 172 may be controllable by the controller 60 (shown in FIG. 1) to provide the resisting force 78 on the tray 134 opposing the applied force 76 of the membrane 70 (see FIG. 1), and resisting pivoting of the tray 134 from the first position of FIG. 6 to a second position of FIG. 7, or may automatically resist pivoting to provide the resisting force 78. The resistance device 172 is shown in a fully deployed position in FIG. 6 and a fully retracted position in FIG. 7.

Figure 7:
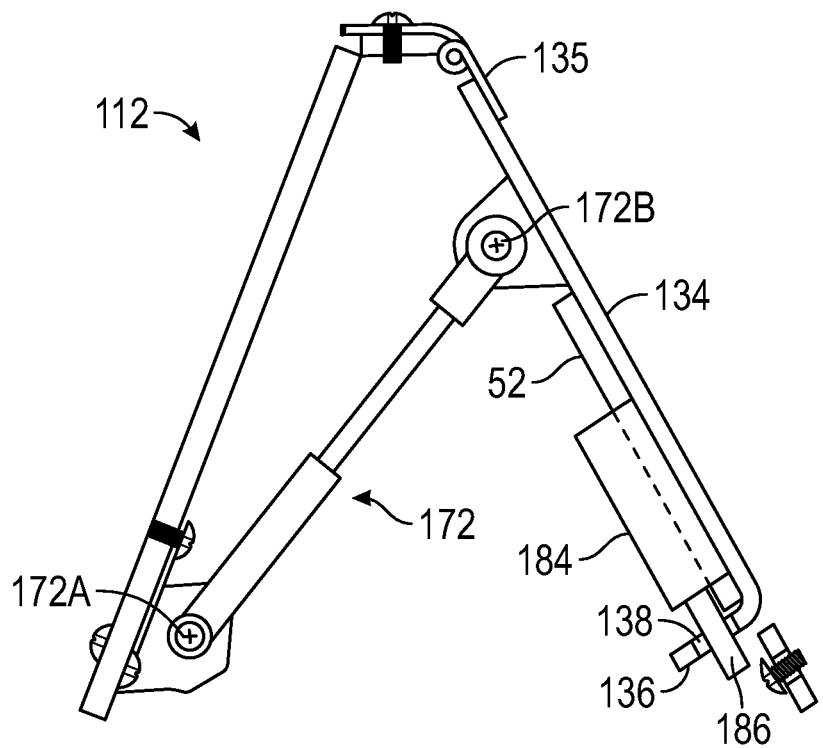
FIG. 7 is a side view illustration of the flange forming device of FIG. 6 with end walls removed and with the pivotable tray in a second position.

As shown in FIG. 6, the flange forming device 112 includes an end wall 180 coupled to the tray 134 and disposed between the membrane 70 and the second heat source 52 when the flange forming device 112 is used in the flange forming apparatus 10 of FIG. 1. The end wall 180 serves as a barrier that prevents the flexible membrane 70 from being pulled under the tray 134 during application of the pressure differential in order to prevent entanglement of the membrane 70 that would interfere with pivoting of the tray 134, and prevent contact of the membrane 70 with the second heat source 52. The end wall 180 is disposed inward of an end wall 182 of the standoff 130, and pivots with the tray 134 inward of the end wall 182. FIG. 7 is a side view illustration of the flange forming device 112 with the end walls 180, 182 removed for clarity in viewing other features, and with the pivotable tray 134 in a second position.

Referring to FIG. 6, the tray 134 has a lip 136 with an aperture 138 extending therethrough. The flange forming device 112 also includes a latching device 184 secured to the standoff 130 and operable to latch the tray 134 in the second position. The latching device 184 may be secured to an inner side of the tray 134, an inner side of the end wall 182, or to a bracket of the standoff 130 that is disposed inward of both end walls 180, 182. The latching device 184 may be operatively connected to the controller 60 and actuatable in response to a control signal provided by the controller 60 to deploy a latch 186 that extends through the aperture 138 when the tray 134 is pivoted to the second position of FIG. 7, thereby latching the tray 134 in the second position. Alternatively, the latching device 184 may automatically latch such as by the lip 136 triggering the latch, or otherwise. Latching of the tray 134 in the second position prevents the resistance device 172 from causing any spring back of the tray 134 toward the first position so that the tray 134 will not contact the formed composite structure 15 as it is curing on the forming tool 16. This ability to latch the tray 134 enables the standoff 130 to be placed close to the forming tool 16 (e.g., minimizing the gap 32) so that the tray 134 supports the flange 14B very close to the forming tool 16 during pivoting of the tray 134, which may help prevent wrinkles.

Figure 8:
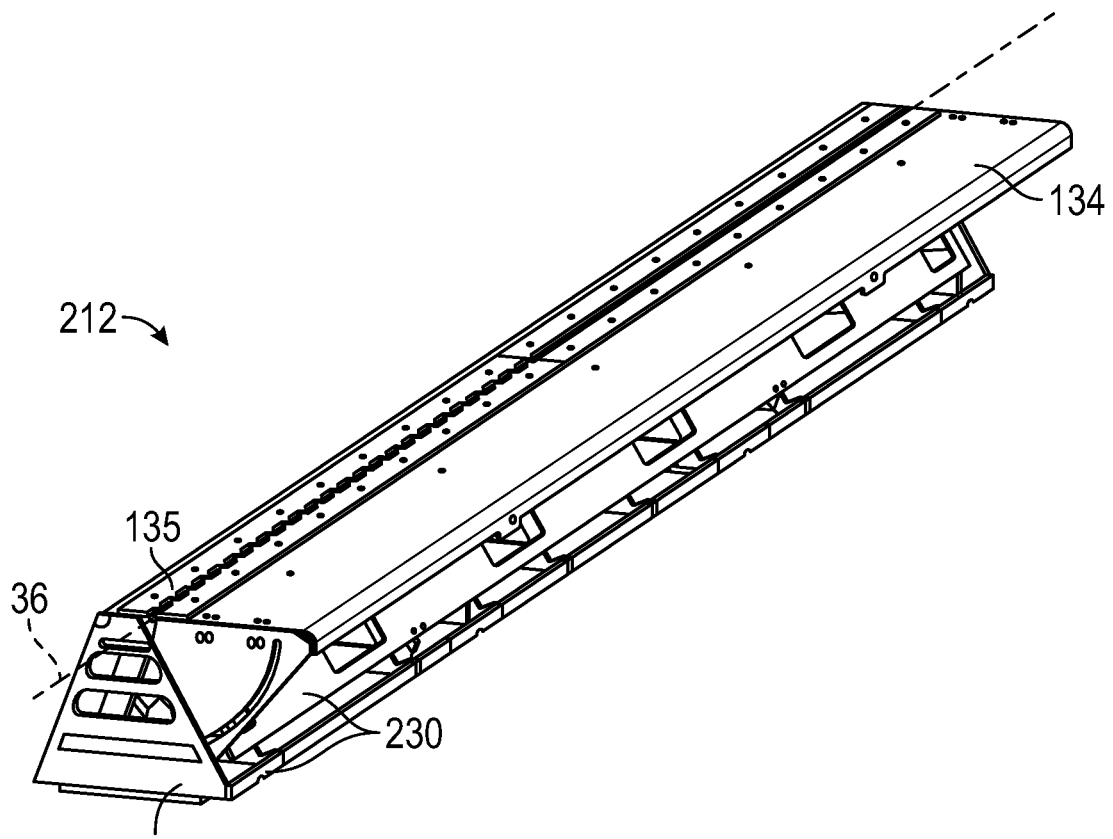
FIG. 8 is an illustration in perspective view of a third embodiment of a flange forming device for use in any of the drape forming apparatuses disclosed herein and with a pivotable tray in a first position.
Figure 9:
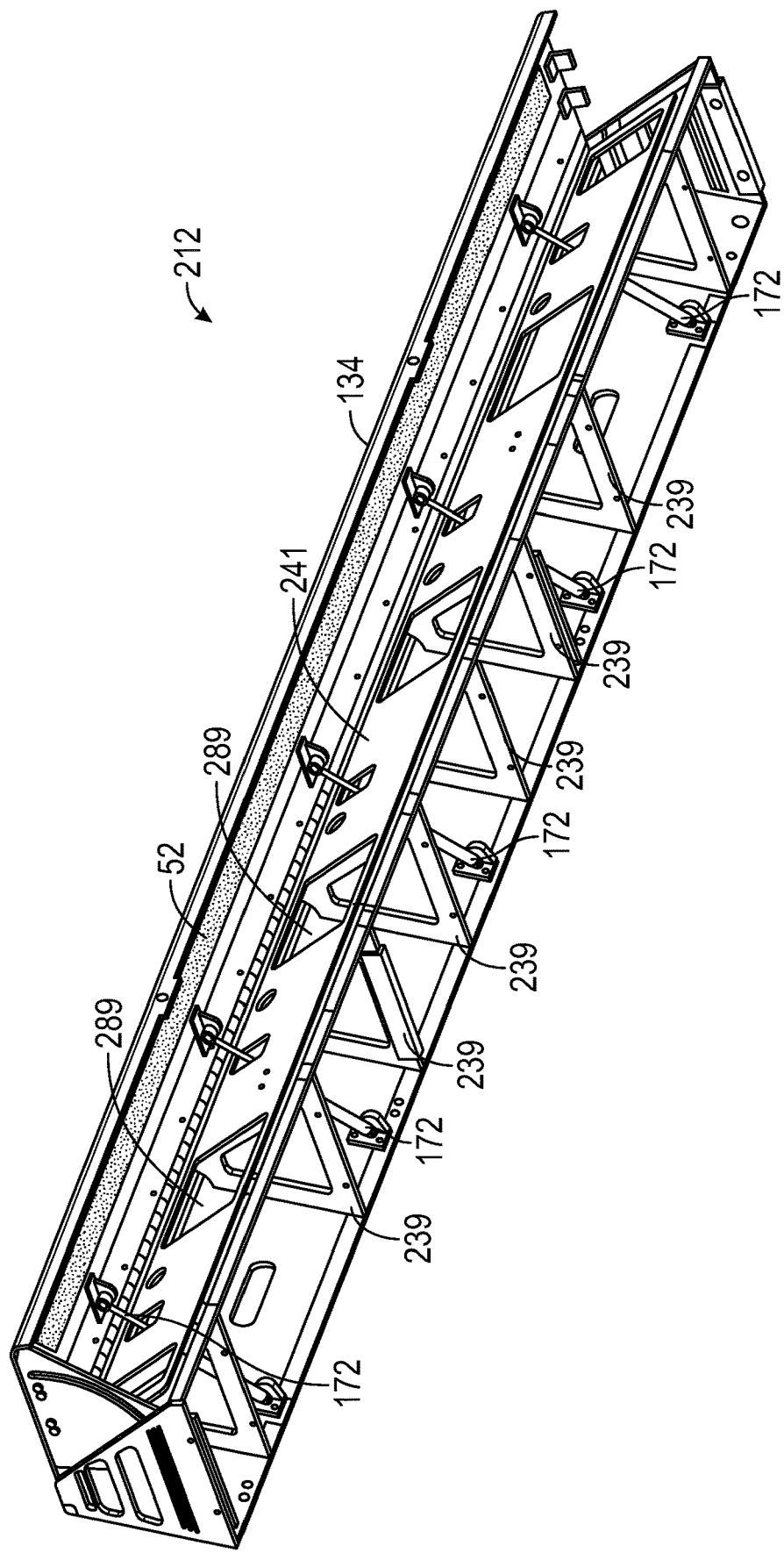
FIG. 9 is an illustration in another perspective view of the flange forming device of FIG. 8.
Figure 10:
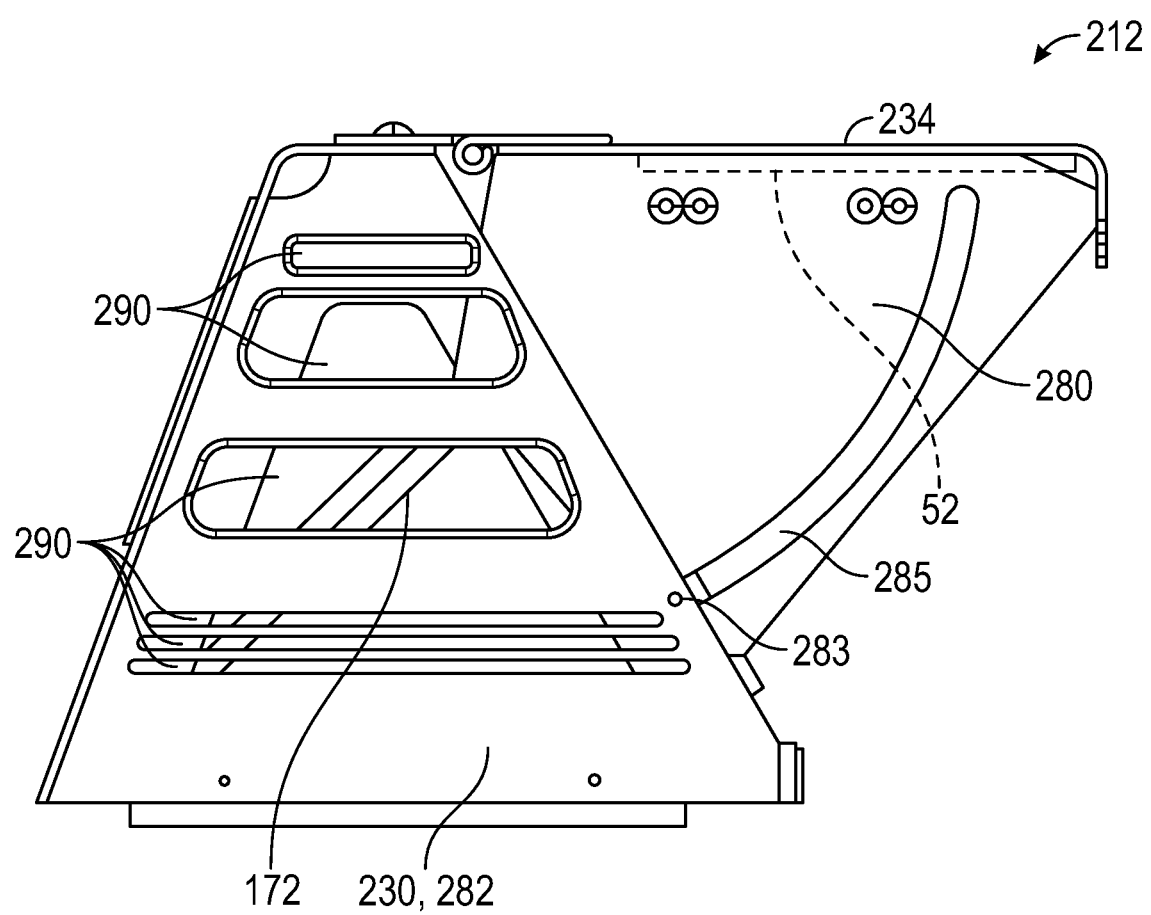
FIG. 10 is a fragmentary side view illustration of the flange forming device of FIG. 8.

FIGS. 8-10 show another embodiment of an alternative flange forming device 212 for use in any of the drape forming apparatuses disclosed herein. The flange forming device 212 includes many of the same components as the flange forming device 112, such as the pivotable tray 134 shown in a first position in FIG. 8, the second heat source 52 configured as the heat blanket secured to the underside of the tray 134, a standoff 230, and a plurality of the resistance devices 172 configured as linear actuators each having one end coupled to the standoff 230 and an opposite end coupled to the tray 134. The resistance devices 172 are shown in fully deployed positions in FIGS. 8-10, but may be retracted to the fully retracted position to move the tray 134 to a second position like that shown in FIG. 7. An end wall 280 extends from the tray 134 and serves as a barrier that prevents the flexible membrane 70 from being pulled under the tray 134 during application of the pressure differential to protect entanglement of the membrane 70 that would interfere with pivoting of the tray 134, and prevent contact of the membrane 70 with the second heat source 52. The end wall 280 is disposed inward of the end wall 282 of the standoff 230, and pivots with the tray 134 inward of the end wall 282. As best shown in FIG. 10, a pin 283 extends inward from the end wall 282 into a slot 285 formed in the end wall 280. Another end wall like end wall 282 may be disposed at the opposite end of the flange forming device 212 but is not shown in FIGS. 8 and 9. The pin 283 and the slot 285 together function as a guide to help stabilize and limit movement of the tray 134 to the direction of pivoting. As can be seen in FIGS. 8 and 9, the flange forming device 212 is elongated. Although shown as relatively straight along its length, multiple flange forming devices of differing lengths and varying in width can be positioned together for manufacturing a flange portion of a nonlinear (e.g., arcuate) composite structure. Accordingly, the applied force 76 is distributed uniformly along the length of the elongated tray 134 by the multiple resistance devices 172. Support brackets 239 are spaced along the length of the flange forming device 212 and are mounted to a front wall 241 to provide structural integrity. The resistance devices 172 extend through apertures 289 in the front wall 241, and a variety of apertures 290 are disposed in the end wall 282. The apertures 289, 290 reduce the thermal mass of the standoff 230. The heat output of the second heat source 52 disposed on the underside of the tray 134 and of the first heat source 50 of FIG. 1 may be controlled to provide the desired forming temperature of range of forming temperatures as described while accounting for the thermal mass of the standoff 230.

Figure 11:
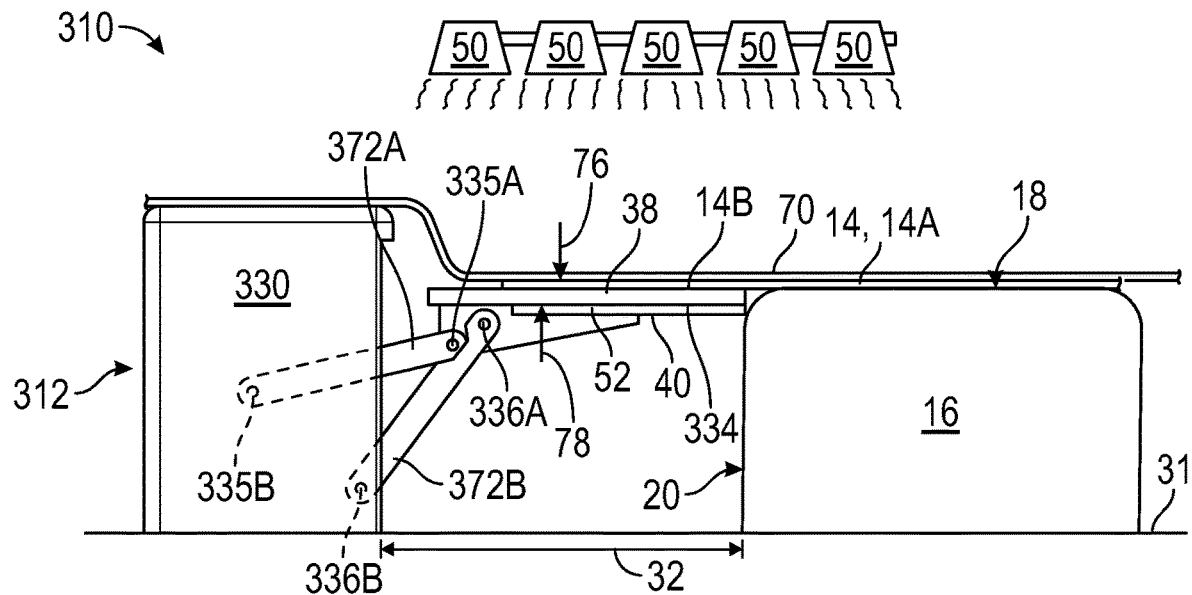
FIG. 11 is a side view illustration of a third embodiment of a drape forming apparatus including a fourth embodiment of a flange forming device and with a pivotable tray in a first position.
Figure 12:
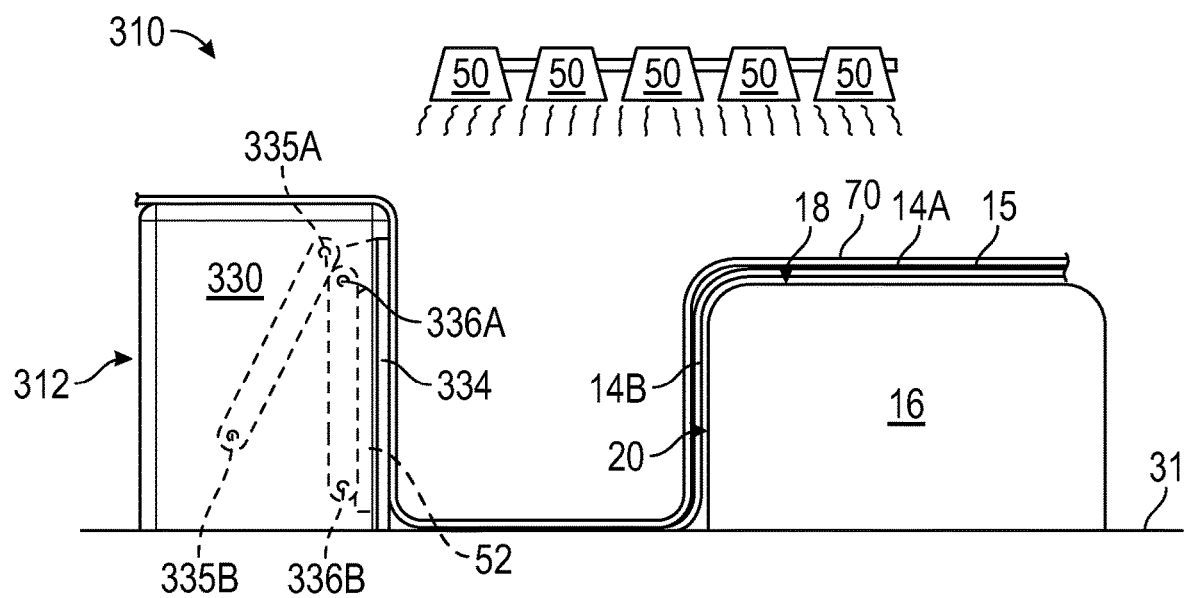
FIG. 12 is a fragmentary side view of the drape forming apparatus of FIG. 11 with the pivotable tray in an intermediate position.

FIG. 11 is a fragmentary side view illustration of a third embodiment of a drape forming apparatus 310 including a fourth embodiment of a flange forming device 312 including the standoff 330 and with a pivotable tray 334 in a first position supporting the composite material 14. FIG. 12 is a fragmentary side view illustration of the drape forming apparatus 310 of FIG. 11 with the pivotable tray 334 in a second position and the composite structure 15 formed. The drape forming apparatus 310 includes many of the same components as the drape forming apparatus 10, including the forming tool 16, the membrane 70 (shown in fragmentary view), at least one first heat source 50, and a standoff 330 similar to standoff 30. The controller 60 and the vacuum 74 may also be included, and are not shown in FIGS. 11-12. The pivotable tray 334 has a first side 38 that faces the first heat source 50 when the tray 334 is in the first position of FIG. 11. The second heat source 52 is secured to the opposite second side 40 of the tray 334 and pivots with the tray 334. The tray 334 is connected to the standoff 330 and is pivotable relative to the standoff 330 via rotatable levers 372A, 372B. The rotatable levers 372A, 372B are each pivotably connected at one end to the tray 334 and at an opposing end to the standoff 330. The hinged tray 334 is rotatable about a first pivot axis 335A and a second pivot axis 336A defined between rotatable levers 372A, 372B and retractable hinged tray 334, and rotatable levers 372A, 372B are rotatable about pivot axes 335B, 336B defined between rotatable levers 372A, 372B and standoff 330, thereby defining a range of motion for retractable hinged tray 334 to be fully retractable within standoff 330. The side of the standoff 330 facing the tray 334 has an open cavity into which the levers 372A, 372B extend and into which the tray 334 retracts when in the second position. As such, the range of motion of the tray 334 is 90 degrees, and facilitates reducing friction between at least one layer of composite material 14 and retractable hinged tray 334 as at least one layer of composite material 14 is withdrawn therefrom and, because the tray 334 withdraws into the cavity of the standoff 330, facilitates reducing the likelihood of the membrane 70 from becoming caught between standoff 330 and retractable hinged tray 334. The composite material 14 is also shown in fragmentary view, and may extend further to the right in the drawing as the drape forming apparatus 310 may include another flange forming device 312 disposed on the opposite side of the tool 16 as that shown for forming another flange portion.

Figure 13:
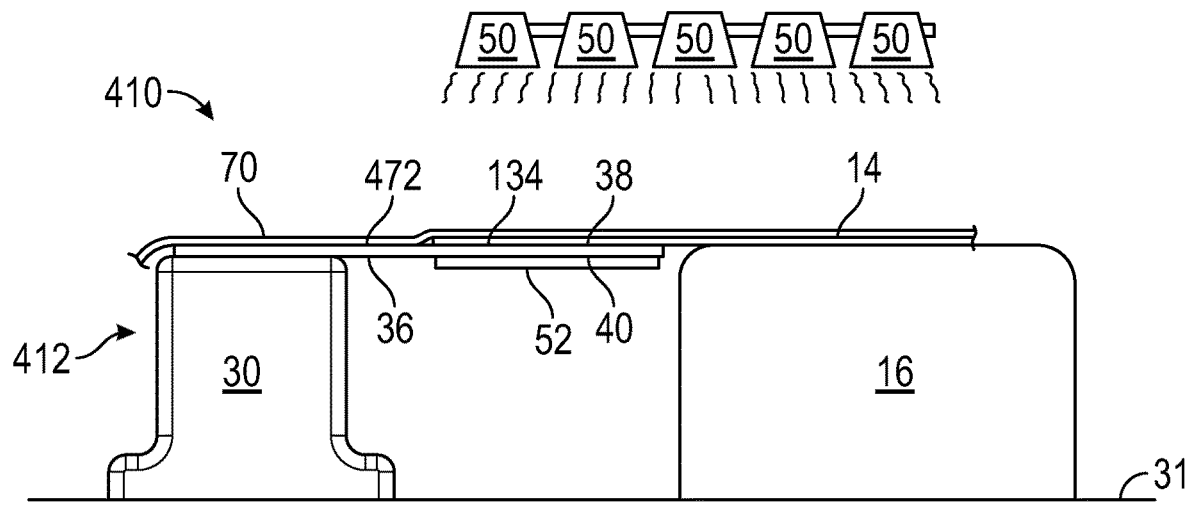
FIG. 13 is a fragmentary side view illustration of a fourth embodiment of a drape forming apparatus including a fifth embodiment of a flange forming device and with a pivotable tray in a first position.
Figure 14:
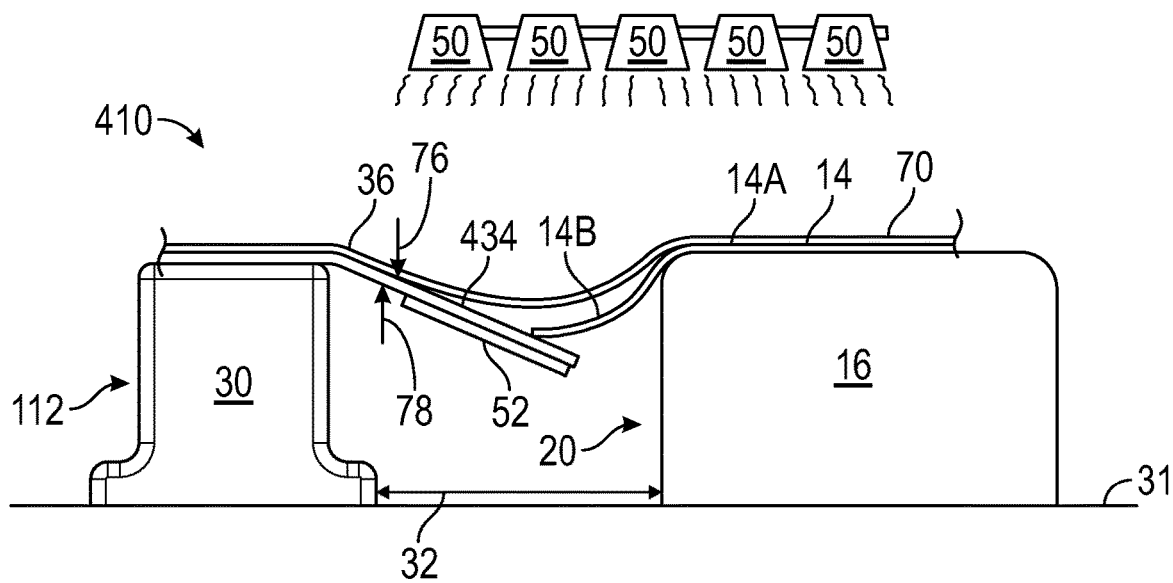
FIG. 14 is a fragmentary side view of the drape forming apparatus of FIG. 13 with the pivotable tray in an intermediate position.

FIG. 13 is a side view illustration of a fourth embodiment of a drape forming apparatus 410 including a fifth embodiment of a flange forming device 412 having a pivotable tray 434 shown in a first position. FIG. 14 is a side view of the drape forming apparatus 410 of FIG. 13 with the pivotable tray 434 pivoted to an intermediate position. Pivoting may continue to a second position in which the tray 434 is disposed at an angle to the standoff 30 like tray 34 in FIG. 4. The drape forming apparatus 410 includes many of the same components as the drape forming apparatus 10, including the forming tool 16, the membrane 70 (shown in fragmentary view), at least one first heat source 50, and the standoff 30. The controller 60 and the vacuum 74 may also be included, and are not shown in FIGS. 13-14. The pivotable tray 434 has a first side 38 that faces the first heat source 50 when the tray 434 is in the first position of FIG. 13. The second heat source 52 is secured to the opposite second side 40 of the tray 434 and pivots with the tray 434. The tray 434 is connected to the standoff 130 and is pivotable relative to the standoff 130 via a resistance device 472 that is an integral reinforcement of the tray 434. Stated differently, the resistance device is a reinforced portion of the tray 434 disposed at pivot axis 36. The tray 434 is a single unitary structure, and deflects when the applied force 76 is induced against elongated tray 434 by the pressure differential over the membrane 70. As such, reinforced portion 472 provides the counteractive resisting force 78 to the tray 434 to control the rate of pivoting of the tray 434 without having any moving parts. Reinforced portion 472 may be fabricated from the same material as tray 434, or may be fabricated from a different stiffer material. When fabricated from the same material, the tray 434 may be thicker at the reinforced portion 472 to increase the stiffness of the tray 434 at the reinforced portion. The composite material 14 is also shown in fragmentary view, and may extend further to the right in the drawing as the drape forming apparatus 410 may include another flange forming device 412 disposed on the opposite side of the tool 16 as that shown for forming another flange portion.

Figure 15:
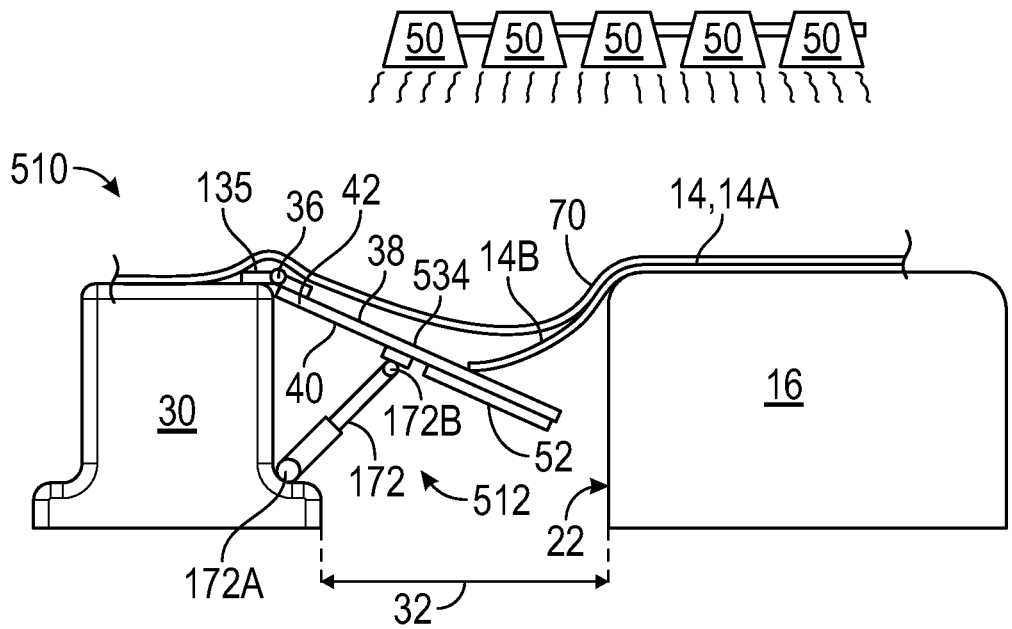
FIG. 15 is a fragmentary side view illustration of a fifth embodiment of a drape forming apparatus including a sixth embodiment of a flange forming device and with a pivotable tray in an intermediate position.

FIG. 15 is a side view illustration of a fifth embodiment of a drape forming apparatus 510 including a sixth embodiment of a flange forming device 512 having a pivotable tray 534 in an intermediate position. The tray 534 is hinged to the standoff 30 at hinge 135 and pivotable relative to the standoff 30 about pivot axis 36 at a hinged end 42. The hinge 135 is not a friction hinge as in FIG. 1. Pivoting may continue to a second position in which the tray 534 is disposed at an angle to the standoff 30 like tray 34 in FIG. 4. The drape forming apparatus 510 includes many of the same components as the drape forming apparatus 10, including the forming tool 16, the membrane 70 (shown in fragmentary view), at least one first heat source 50, and the standoff 30. The controller 60 and the vacuum 74 may also be included, and are not shown in FIG. 15. The pivotable tray 534 has a first side 38 that faces the first heat source 50 when the tray 534 is in a first position like that of FIG. 1 (e.g., a horizontal position). The second heat source 52 is secured to the opposite second side 40 of the tray 534 and pivots with the tray 534. A resistance device 172 that is a linear actuator like linear actuator 172 of FIG. 7, has one end 172B pivotably connected to the tray and an opposite end 172A pivotably connected to the standoff 30. The resistance device 172 may be controllable by the controller 60 (shown in FIG. 1) to provide the resisting force 78 on the tray 534 opposing the applied force 76 of the membrane 70 (see FIG. 1), and resisting pivoting of the tray 534 from the first position to a second position like that of FIG. 4, or may automatically resist pivoting to provide the resistance force 76. Because the pivotably connected end 172A of the resistance device 172 is at an exterior of the standoff 30 in the gap 32 rather than within a cavity of the standoff 30 as in standoff 130 in FIGS. 6-7 and standoff 230 in FIG. 10, the gap 32 is larger than when standoffs 130 or 230 are used in order to enable the tray 534 to pivot to a second position at which the composite material 14 is fully withdrawn and formed to the second surface 22. The composite material 14 is also shown in fragmentary view, and may extend further to the right in the drawing as the drape forming apparatus 510 may include another flange forming device 512 disposed on the opposite side of the tool 16 as that shown for forming another flange portion.

Figure 16:
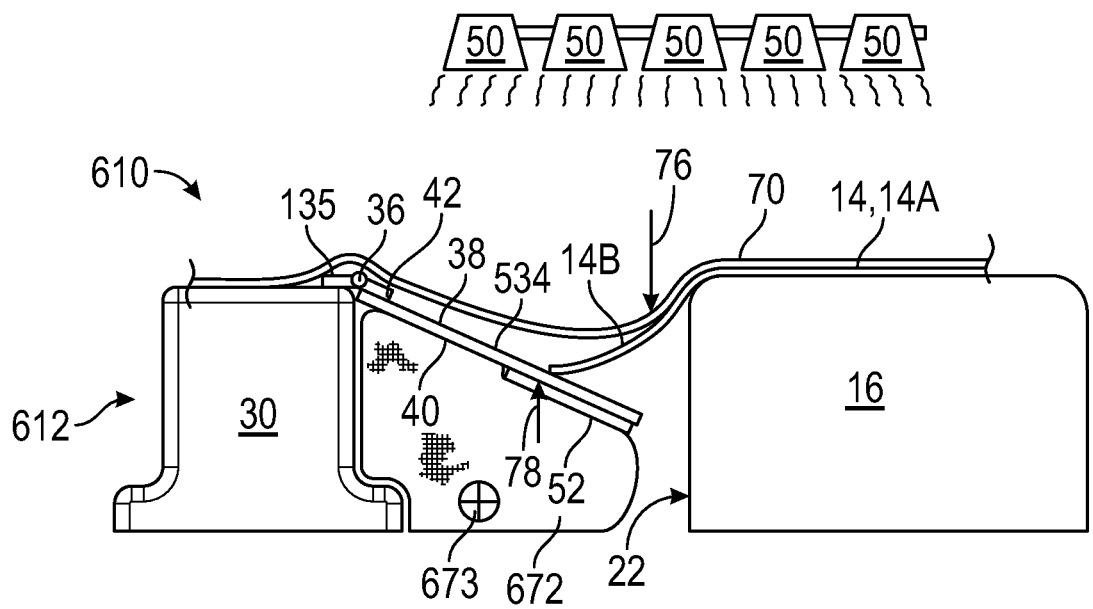
FIG. 16 is a fragmentary side view illustration of a sixth embodiment of a drape forming apparatus including a seventh embodiment of a flange forming device and with a pivotable tray in an intermediate position.

FIG. 16 is a side view illustration of a sixth embodiment of a drape forming apparatus 610 including a seventh embodiment of a flange forming device 612 that has the pivotable tray 534 in an intermediate position. The tray 534 is hinged to the standoff 30 at hinge 135 and pivotable relative to the standoff 30 about pivot axis 36 at hinged end 42. Pivoting may continue to a second position in which the tray 534 is disposed at an angle to the standoff 30 like tray 34 in FIG. 4. The drape forming apparatus 610 includes many of the same components as the drape forming apparatus 10, including the forming tool 16, the membrane 70 (shown in fragmentary view), at least one first heat source 50, and the standoff 30. The controller 60 and the vacuum 74 may also be included, and are not shown in FIG. 16. The pivotable tray 534 has a first side 38 that faces the first heat source 50 when the tray 534 is in a first position like that of FIG. 1 (e.g., a horizontal position). The second heat source 52 is secured to the opposite second side 40 of the tray 534 and pivots with the tray 534. A resistance device 672 is an inflatable bladder that is disposed between the standoff 30 and the tray 534 in the gap 32 and applies the resisting force 78 to the tray 534 opposing the applied force 76. The resistance device 672 may be adhered to the second heat source 52 and the underside of the tray 534 not covered by the second heat source 52. The inflatable bladder 672 may be selectively filled with any suitable fluid, which enables inflatable bladder 672 to bias against tray 534 and provide the counteractive resisting force 78 thereto. As pressure is applied by pressurized bladder 672, tray 534 deforms inflatable bladder 672 as tray 534 pivots about pivot axis 36. Pressure within the resistance device 672 may be varied via a valve 673 controlled by the controller 60, or the valve 673 may automatically release fluid in response to the applied force 76 to decrease pressure, allowing the tray 534 to pivot to the second position under the applied force 76. The composite material 14 is also shown in fragmentary view, and may extend further to the right in the drawing as the drape forming apparatus 610 may include another flange forming device 612 disposed on the opposite side of the tool 16 as that shown for forming another flange portion.

Figure 17:
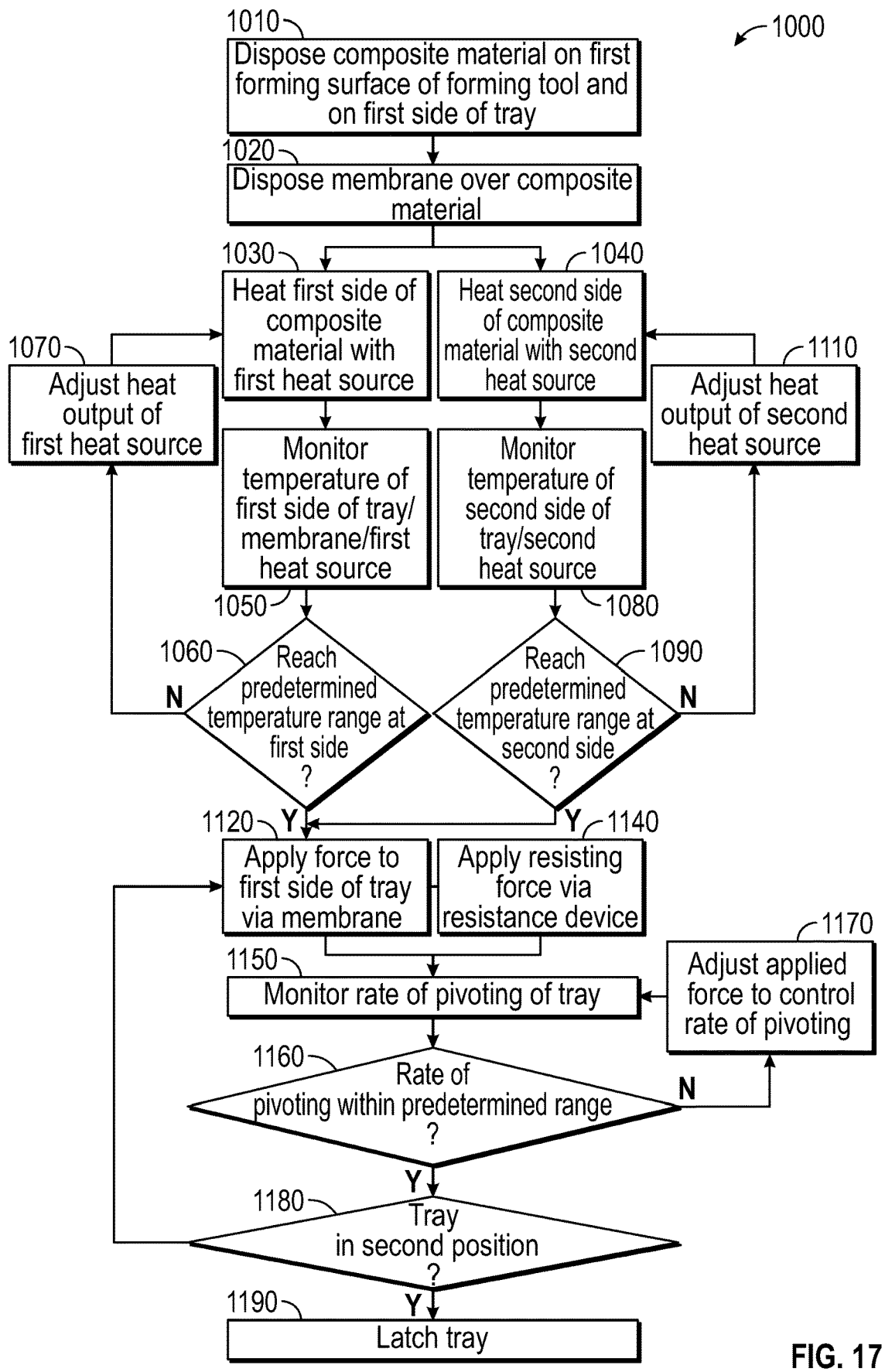
FIG. 17 is a functional block diagram flow chart illustrating aspects of an embodiment of a method of forming a composite structure.

FIG. 17 is a functional block diagram flow chart illustrating an embodiment of a method 1000 of forming a composite structure such as composite structure 15 using any of the drape forming apparatuses and flange forming devices disclosed herein. The method 1000 may begin at block 1010, disposing at least one layer of composite material 14 over a first forming surface 18 of a forming tool 16. Block 1010 is accomplished so that a portion of the at least one layer of composite material 14 is positioned on a first side of a tray coplanar with the first forming surface 18 when the tray is in a first position. The tray may be any of the trays 34, 134, 234, 334, 434, and 534, disclosed herein having a hinged end and a distal end with the distal end nearer the first forming surface 18 than the hinged end when the tray is in the first position.

The method 1000 then proceeds to block 1020, disposing a membrane 70 over the forming tool 16 and the tray. With the composite material 14 and the membrane 70 disposed as set forth in blocks 1010 and 1020, the method 1000 proceeds to blocks 1030 and 1040, heating a first side 17 of the at least one layer of composite material 14 with a first heat source 50 in block 1030, the first side facing the first heat source 50 when the tray is in the first position, and heating a second side 19 of the at least one layer of composite material 14 with a second heat source 52 in block 1040, the second heat source 52 disposed at a second side of the tray. Blocks 1030 and 1040 may be carried out simultaneously to shorten the processing time.

Moreover, the heating conducted in blocks 1030 and 1040 may be done in a controlled manner. For example, in optional block 1050, the temperature may be monitored at the first side of the membrane 70, or at the first side of the tray, or simply at the first heat source 50, such as with one or more thermocouples operatively connected to the controller 60. The controller 60 may determine whether a predetermined temperature has been reached or exceeded in block 1060. If the predetermined temperature has not been reached or exceeded, the method 1000 can optionally adjust the heat output of the first heat source 50 in block 1070, and then moves to block 1030 to continue heating the first side in block 1030 until the predetermined temperature of block 1050 is reached or exceeded.

Similarly, in optional block 1080, the temperature may be monitored at the second side of the membrane 70, or at the second side of the tray, or simply at the second heat source 52, such as with one or more thermocouples operatively connected to the controller 60. The controller 60 may determine whether a predetermined temperature has been reached or exceeded in block 1090. The predetermined temperature of block 1090 may be the same as or different than the predetermined temperature of block 1060. If the predetermined temperature has not been reached or exceeded in block 1090, the method 1000 can optionally adjust the heat output of the second heat source 52 in block 1110, and then continue heating the second side of the composite material 14 in block 1040 until the predetermined temperature of block 1090 is reached or exceeded. For example, adjusting the heat output in blocks 1070, 1110 results in controlling the heat output of at least one of the first heat source and the second heat source to limit a temperature gradient between the first side of the at least one layer of composite material and the second side of the at least one layer of composite material.

Once the requisite temperatures have been achieved in both blocks 1060 and 1090, the composite material 14 is sufficiently heated for drape forming a flange portion 14B (and, optionally, 14C), and the method 1000 proceeds to block 1120, applying a force 76 (e.g., applied force 76) on the tray such that the tray pivots about the hinged end 42, the distal end 44 moves away from the forming tool 16, and such that the portion 14B of the at least one layer of composite material 14 is withdrawn from the tray and is disposed against the second forming surface 22 of the forming tool 16 that is nonplanar with the first forming surface to form a flange. As discussed, the drape forming apparatuses disclosed herein may be configured so that applied pressure is applied to an exterior surface of the membrane 70, a vacuum is applied to an interior surface of the membrane 70 (e.g., at the side of the membrane where the tray is disposed), or both.

Simultaneously with block 1120, the method 1000 may include block 1140, exerting a resisting force 78 on the tray via a resistance device coupled to the tray to control a rate of pivoting of the tray, the resisting force 78 opposing the force applied 76 on the tray. In one example, the rate of pivoting of the tray may be controlled to be uniform (constant) and a resulting rate of forming the portion of the at least one layer of composite material against the second forming surface is therefore uniform (constant). Any of the resistance devices 72, 172, 272, 372, 472, and 672 disclosed herein may be used. As the resistance force 78 exerted by some embodiments of the resistance devices 72, 172, and 672 may be varied, optionally, the controller 60 may monitor the rate of pivoting of the tray in block 1150 with position sensors or the like, determine in block 1160 whether the rate of pivoting (e.g., angles per second) is within a predetermined range, and if not, adjust either or both of the applied force 76 or the resistance force 78 in block 1170 to control the rate of pivoting of the tray. For example, the rate of pivoting could be adjusted by increasing or decreasing the pressure differential applied to the membrane 70 (e.g., increase or decrease pressure or vacuum), increasing or decreasing the friction of the friction hinge 72, increasing or decreasing the deployment rate of the linear actuator 172, or increasing or decreasing the rate of deflation of the resistance device 672. As another alternative, any of the resistance devices disclosed herein may be configured to automatically (e.g., not via the controller 60) provide a resistance force 78 that is not variable by the controller 60, but that is at a predetermined magnitude that allows the tray to pivot at a rate equal to a desired forming rate of the flange portion, which may be based on prior testing, and will not pinch the composite material between the membrane 70 and the tray as it pivots.

Optionally, the method 1000 may include block 1180, determining whether the tray reaches a predetermined second position, which is a final position of the tray in which the flange portion 14B of the composite material 14 is fully withdrawn from the tray and, accordingly, in contact with the second forming surface 20 in the shape of the composite structure 15. A contact sensor may be utilized to determine the position of the tray in block 1180.

Optionally, in some implementations, the method 1000 may include activating a latching device 184 to latch the tray in the second position in block 1190. As discussed, latching prevents spring back of resistance devices such as pneumatic linear actuators and is beneficial when the gap 32 is minimal and the tray could otherwise contact the flange portion 14B on spring back, potentially deforming the flange portion 14B.

The following Items provide example configurations of a drape forming apparatus, a device for use in forming a composite structure, and a method of forming a composite structure disclosed herein.

Item 1. A drape forming apparatus for use in forming a composite structure, the drape forming apparatus comprising: a forming tool having a first forming surface and a second forming surface nonplanar with the first forming surface; a tray spaced apart from the forming tool and having a first side and a second side, the tray having a hinged end and a distal end, the tray configured to pivot about the hinged end from a first position to a second position under an applied force such that the distal end moves away from the forming tool; a first heat source and a second heat source; wherein the first side of the tray faces the first heat source when the tray is in the first position; and wherein the second heat source is disposed at the second side of the tray.

Item 2. The drape forming apparatus of item 1, wherein the second heat source is a heat pad that includes a resistance heating element.

Item 3. The drape forming apparatus of any of items 1-2, wherein the first heat source is at least one heat lamp fixed in position relative to the forming tool.

Item 4. The drape forming apparatus of any of items 1-3, further comprising: a membrane disposed over the forming tool and the tray on the first side of the tray and configured to exert the applied force on the tray in response to a pressure differential on opposing sides of the membrane.

Item 5. The drape forming apparatus of item 4, wherein the first heat source is a heat blanket disposed on the membrane.

Item 6. The drape forming apparatus of item 4, further comprising: an end wall coupled to the tray and disposed between the membrane and the second heat source.

Item 7. The drape forming apparatus of any of items 1-6, further comprising: a standoff spaced apart from the forming tool, the standoff coupled to and supporting the hinged end of the tray.

Item 8. The drape forming apparatus of item 7, further comprising: a latching device secured to the standoff and operable to latch the tray in the second position.

Item 9. The drape forming apparatus of any of items 1-8, further comprising: a resistance device coupled to the tray and operable to exert a resisting force on the tray resisting pivoting of the tray from the first position to the second position.

Item 10. The drape forming apparatus of item 9, wherein the resistance device is one of a linear actuator, a friction hinge, a rotatable lever, an inflatable bladder, or an integral reinforcement.

Item 11. The drape forming apparatus of item 9, further comprising: a membrane disposed over the forming tool and the tray at the first side of the tray; and an electronic controller operatively connected to the membrane; wherein the membrane is configured to exert the applied force on the tray in response to a pressure differential on opposing sides of the membrane; wherein the electronic controller is configured to control the pressure differential to achieve a controlled rate of pivoting of the tray.

Item 12. The drape forming apparatus of any of items 1-10, further comprising: an electronic controller operatively connected to the first heat source and to the second heat source and operable to control heat output of the first heat source and heat output of the second heat source.

Item 13. A device for use in forming a composite structure, the device comprising: a standoff; a tray having a first side and a second side, the tray having a hinged end and a distal end, the tray configured to pivot about the hinged end from a first position to a second position under an applied force; and a heat source secured to the second side of the tray.

Item 14. The device of item 13, wherein the heat source is a heat pad that includes a resistance heating element.

Item 15. The device of any of items 13-14, further comprising: an end wall coupled to the tray and extending away from the first side between the hinged end and the distal end, the end wall and the tray at least partially enclosing the heat source.

Item 16. The device of any of items 13-15, further comprising: a latching device secured to the standoff and operable to latch the tray in the second position.

Item 17. The device of any of items 13-16, further comprising: a resistance device coupled to the tray and operable to exert a resisting force on the tray that resists pivoting of the tray from the first position to the second position.

Item 18. The device of item 17, wherein the resistance device is one of a linear actuator, a friction hinge, rotatable levers, an inflatable bladder, or an integral reinforcement.

Item 19. The device of any of items 13-18, further comprising: an electronic controller operatively connected to the heat source and operable to control heat output of the heat source.

Item 20. A method of forming a composite structure, the method comprising: disposing at least one layer of composite material over a first forming surface of a forming tool so that a portion of the at least one layer of composite material is positioned on a first side of a tray coplanar with the first forming surface when the tray is in a first position, the tray having a hinged end and a distal end with the distal end nearer the first forming surface than the hinged end when the tray is in the first position; heating a first side of the at least one layer of composite material with a first heat source, the first side facing the first heat source when the tray is in the first position; heating a second side of the at least one layer of composite material with a second heat source, the second heat source disposed at a second side of the tray; applying a force on the tray such that the tray pivots about the hinged end, the distal end moves away from the forming tool, and such that the portion of the at least one layer of composite material is withdrawn from the tray and is disposed against a second forming surface of the forming tool nonplanar with the first forming surface.

Item 21. The method of item 20, further comprising: disposing a membrane over the forming tool and the tray; wherein the force is applied on the tray via the membrane.

Item 22. The method of item 21, wherein applying the force on the tray is by applying a vacuum on one side of the membrane.

Item 23. The method of item 21, wherein applying the force on the tray is by pressurizing one side of the membrane.

Item 24. The method of any of items 20-23, further comprising: controlling heat output of at least one of the first heat source and the second heat source to limit a temperature gradient between the first side of the at least one layer of composite material and the second side of the at least one layer of composite material.

Item 25. The method of any of items 20-24, further comprising: exerting a resisting force on the tray via a resistance device coupled to the tray to control a rate of pivoting of the tray, the resisting force opposing the force applied on the tray.

Item 26. The method of item 25, further comprising: controlling, via an electronic controller, the force applied on the tray so that a rate of pivoting of the tray is uniform and a resulting rate of forming the portion of the at least one layer of composite material against the second forming surface is uniform.

Item 27. The method of any of items 20-26, further comprising: activating a latching device to latch the tray in the second position.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A drape forming apparatus for use in forming a composite structure, the drape forming apparatus comprising:
   a forming tool having a first forming surface and a second forming surface nonplanar with the first forming surface;
   a tray spaced apart from the forming tool and having a first side and a second side, the tray having a hinged end and a distal end, the tray configured to pivot about a pivot axis at the hinged end from a first position to a second position under an applied force such that the distal end moves away from the forming tool;
   wherein the distal end is disposed at the first side of the tray furthest from the pivot axis;
   a first heat source and a second heat source;
   a membrane disposed over the forming tool and the tray on the first side of the tray and configured to exert the applied force on the tray in response to a pressure differential on opposing sides of the membrane;
   an end wall coupled to the tray, extending further therefrom than the second heat source, and disposed between the membrane and the second heat source; and
   a standoff spaced apart from the forming tool, the standoff coupled to and supporting the hinged end of the tray;
   wherein the end wall extends from the standoff to the distal end and spans an entire distance from an edge of the standoff to the distal end when the tray is in the first position;
   wherein the first heat source is fixed in position relative to the forming tool;
   wherein the first side of the tray faces the first heat source when the tray is in the first position;
   wherein the second heat source is disposed on and fixed to the second side of the tray and moves with the tray; and
   wherein the first side of the tray moves further away from the first heat source during pivoting of the tray at a rate of pivoting such that composite material disposed on the tray is incrementally withdrawn from the tray at the distal end at a rate corresponding with the rate of pivoting such that a portion of the composite material furthest from the first heat source and nearer to the hinged end than to the distal end is heated by the second heat source longer than a portion of the composite material nearer to the first heat source and nearer to the distal end than to the hinged end.

2. The drape forming apparatus of claim 1, wherein the second heat source is a heat pad that includes a resistance heating element.

3. The drape forming apparatus of claim 1, wherein the first heat source is at least one heat lamp.

4. The drape forming apparatus of claim 1, further comprising:
   a latching device secured to the standoff and operable to latch the tray in the second position.

5. The drape forming apparatus of claim 1, further comprising:
   a resistance device coupled to the tray and operable to exert a resisting force on the tray resisting pivoting of the tray from the first position to the second position.

6. The drape forming apparatus of claim 5, wherein the resistance device is one of a linear actuator, a friction hinge, a rotatable lever, an inflatable bladder, or an integral reinforcement.

7. The drape forming apparatus of claim 1, further comprising:
   an electronic controller operatively connected to the membrane; wherein the membrane is configured to exert the applied force on the tray in response to a pressure differential on opposing sides of the membrane; and wherein the electronic controller is configured to control the pressure differential to achieve a controlled rate of pivoting of the tray.

8. The drape forming apparatus of claim 1, further comprising:
   an electronic controller operatively connected to the first heat source and to the second heat source and operable to control heat output of the first heat source and heat output of the second heat source.

9. A device for use in forming a composite structure, the device comprising:
   a standoff;
   a tray supported by the standoff and having a first side and a second side, the tray having a hinged end and a distal end, the tray configured to pivot relative to the standoff about the hinged end from a first position to a second position under an applied force;

a heat source secured to the second side of the tray and pivotable with the tray such that composite material disposed on the tray is incrementally withdrawn from the tray at the distal end at a rate corresponding with a rate of pivoting of the tray such that a portion of the composite material nearer to the hinged end than to the distal end is heated by the heat source longer than a portion of the composite material nearer to the distal end than to the hinged end;

an end wall coupled to the tray and extending away from the first side between the hinged end and the distal end and further from the first side than the heat source, the end wall and the tray at least partially enclosing the heat source;

wherein the end wall extends from the standoff to the distal end when the tray is in the first position;

a latching device secured to the standoff and operable to latch the tray in the second position;

wherein the tray has a lip with an aperture extending through the lip; and wherein the latching device includes a latch that extends through the aperture when the tray is pivoted to the second position.

10. The device of claim 9, wherein the heat source is a heat pad that includes a resistance heating element.

11. The device of claim 9, further comprising:
a resistance device coupled to the tray and operable to exert a resisting force on the tray that resists pivoting of the tray from the first position to the second position.

12. The device of claim 11, wherein the resistance device is one of a linear actuator, a friction hinge, rotatable levers, an inflatable bladder, or an integral reinforcement.

13. The device of claim 9, further comprising:
an electronic controller operatively connected to the heat source and operable to control heat output of the heat source.

14. The drape forming apparatus of claim 1, further comprising:
a resistance device coupled to the tray and operable to exert a resisting force on the tray resisting pivoting of the tray from the first position to the second position;
wherein:
the standoff has an additional end wall; and
the end wall coupled to the tray is disposed inward of the additional end wall of the standoff and outward of the resistance device, and pivots with the tray inward of the additional end wall of the standoff and outward of the resistance device.

15. The drape forming apparatus of claim 4, wherein:
the tray has a lip with an aperture extending through the lip; and
the latching device includes a latch that extends through the aperture when the tray is pivoted to the second position.

16. The drape forming apparatus of claim 6, wherein the resistance device is a linear actuator having an end pivotably coupled to the standoff and an opposite end pivotably coupled to the tray.

17. The device of claim 9, wherein:
the standoff has an additional end wall; and
the end wall coupled to the tray is disposed inward of the additional end wall of the standoff and pivots with the tray inward of the additional end wall of the standoff.

18. The device of claim 12, wherein the resistance device is a linear actuator having an end pivotably coupled to the standoff and an opposite end pivotably coupled to the tray.

19. A drape forming apparatus for use in forming a composite structure, the drape forming apparatus comprising:
a forming tool having a first forming surface and a second forming surface nonplanar with the first forming surface;
a tray spaced apart from the forming tool and having a first side and a second side, the tray having a hinged end and a distal end, the tray configured to pivot about the hinged end from a first position to a second position under an applied force such that the distal end moves away from the forming tool;
a first heat source and a second heat source;
a membrane disposed over the forming tool and the tray on the first side of the tray and configured to exert the applied force on the tray in response to a pressure differential on opposing sides of the membrane;
an end wall coupled to the tray, extending further therefrom than the second heat source, and disposed between the membrane and the second heat source;
a standoff spaced apart from the forming tool, the standoff coupled to and supporting the hinged end of the tray; and
a latching device secured to the standoff and operable to latch the tray in the second position;
wherein the tray has a lip with an aperture extending through the lip;
wherein the latching device includes a latch that extends through the aperture when the tray is pivoted to the second position;
wherein the end wall extends from the standoff to the distal end when the tray is in the first position;
wherein the first heat source is fixed in position relative to the forming tool;
wherein the first side of the tray faces the first heat source when the tray is in the first position;
wherein the second heat source is disposed on and fixed to the second side of the tray and moves with the tray; and
wherein the first side of the tray moves further away from the first heat source during pivoting of the tray at a rate of pivoting such that composite material disposed on the tray is incrementally withdrawn from the tray at the distal end at a rate corresponding with the rate of pivoting such that a portion of the composite material furthest from the first heat source and nearer to the hinged end than to the distal end is heated by the second heat source longer than a portion of the composite material nearer to the first heat source and nearer to the distal end than to the hinged end.

20. The drape forming apparatus of claim 19, wherein the first heat source is at least one heat lamp.

* * * * *